United States Patent

[11] 3,576,431

| [72] | Inventors | Edward F. Zaccard<br>Burlington;<br>Lester R. Rabb, Greensburg, Pa.; Henry A. Mathisen, Northbrook, Ill. |
|---|---|---|
| [21] | Appl. No. | 683,713 |
| [22] | Filed | Nov. 16, 1967 |
| [45] | Patented | Apr. 27, 1971 |
| [73] | Assignee | Addressograph-Multigraph Corporation<br>Mount Prospect, Ill. |

[54] RECORDING AND COMPUTING DEVICE
10 Claims, 5 Drawing Figs.

[52] U.S. Cl. .................................................. 235/92,
355/14
[51] Int. Cl. ......................................................... G06m 7/06
[50] Field of Search ............................................ 340/347;
235/92; 324/111; 355/14

[56] References Cited
UNITED STATES PATENTS

| 3,231,877 | 1/1966 | Marlot | 340/206 |
| 3,002,690 | 10/1961 | Meyer | 235/183 |
| 2,994,825 | 8/1961 | Anderson | 328/129 |
| 3,296,613 | 1/1967 | Andersen | 340/347 |
| 3,458,809 | 7/1969 | Dorey | 324/99 |
| 3,067,936 | 12/1962 | Kasper | 235/151 |
| 3,358,570 | 12/1967 | Morrill | 355/14 |

*Primary Examiner*—Maynard R. Wilbur
*Assistant Examiner*—Robert F. Gnuse
*Attorney*—Sol L. Goldstein ABSTRACT: The apparatus of this invention programs a duplicating machine 16 to make a preset number of copies, computes a cost charged per copy based on the number of copies programmed, and records the cost computed in terms of relative numerical values. A computing instrument 12 provides, as copies are made, differing numbers of pulses per copy. The pulses activate a recorder 14 which gives a cumulative numerical indication of the number of pulses received; each pulse received by the recorder 14 corresponds to a fixed unit of cost. A variable resistor control element 84 in response to the occurrence of events regulates the pulse output of the instrument 12 so that fewer pulses are provided as more copies are made.

Patented April 27, 1971

Inventors:
Edward F. Zaccard
Henry A. Mathison
Lester R. Raab
By: Sol L. Goldstein &
John J. Connors
Attys.

Patented April 27, 1971

Inventors:
Edward F. Zaccard
Henry A. Mathison
Lester R. Raab
By: Sol L. Goldstein &
John J. Connors
Attys.

3,576,431

RECORDING AND COMPUTING DEVICE

BACKGROUND OF INVENTION

This invention relates to a computing instrument which generates as events occur differing numbers of pulses per event. More particularly, this invention concerns a programming, computing, and recording apparatus adapted to be used with an associated piece of equipment.

For purposes of illustration, the apparatus of this invention is considered as being used as a cost regulating and recording apparatus of the type used with rented duplicating machines, but this is not its only application. In response to a custoer's command the apparatus programs the duplicating machine to make a preset number of copies, computes and records as copies are made an average cost per copy based on the size of the copy order, and automatically shuts the machine off upon completion of the program. Computing means produce differing numbers of pulses per copy as copies are made, and a pulse responsive counter gives a cumulative numerical indication of the number of pulses produced. Each pulse transmitted to counter corresponds to a fixed unit of cost. Since the customer is usually charged a lower average cost for larger copy orders than for smaller copy orders, obviously fewer numbers of pulses must be generated for larger copy orders than for smaller copy orders. To achieve this, control means regulate the pulse output of the computing means.

SUMMARY OF INVENTION

In accordance with the principal feature of this invention there is provided a computing instrument which produces as a series of events occurs differing numbers of pulses per event. A control conduction device operable between a conductive state and nonconductive state and a capacitor coupled to the conduction device serve as a pulse generator. The capacitor, upon being charged to a predetermined level, changes the state of the device from conductive to nonconductive and discharges through said device to produce a pulse. When the capacitor discharges, the conduction device returns to a nonconductive state. Means actuated as events occur charge the capacitor, and control means associated with the charinging means and operated as events occur regulate the charinging rate. Thus, varying numbers of pulses are produced per event.

The control means comprise a variable resistor control element having a movable operator adjustable between a start setting corresponding to an initial charging rate and a plurality of different control settings corresponding to different charging rates. Cam means having a portion graduated in a predetermined manner and cam follower means connected to said operator govern the setting of the operator. In response to the occurrence of events the cam means is moved to different control positions, and the follower means rides along the graduated portion to adjust the operator setting.

The programming, computing, and recording apparatus of this invention includes the combination of programming means for programming the occurrence of a preset number of events, the computing instrument, and means coupled to said pulse generating means and actuated upon the generation of a pulse for providing a cumulative numerical indication of the pulses received.

The programming means comprises means for providing a control signal when the preset number of events have occurred. Among other things, this control signal turns off the associated piece of equipment and actuates means which reset the operator of the control element at its start setting.

In accordance with a detailed, but nevertheless important feature of this invention, the programming means also includes a depressable handle member which when depressed activates means for canceling the programmed number of events. The canceling means can only be activated after the associated equipment has been programmed to provide a preset number of events. This feature is desirable since dishonest parties may be tempted to tamper with the programming means in an attempt to defeat the cost recording function of the apparatus. By having the handle actuate the canceling means, tampering will be discouraged because the program will be immediately abrogated. This feature is also desirable because the customer can then stop the production of copies at any time before the order has been completed. He may wish to do this merely because he desires to change the program or because the associate piece of equipment is malfunctioning.

Accordingly, one object of this invention is to provide an improved computing instrument employing simplified electronic components to generate as a series of events occur differing numbers of pulses per event.

Another object of this invention is to provide an improved programming, computing, and recording apparatus which gives reliable service, and is easily constructed and simple to operate.

A specific object of this invention is to provide a compact and versatile apparatus for regulating and recording cost. This cost regulating and recording apparatus, having a minimum number of mechanical and electrical parts acting in cooperation, computes and records an average cost per event based on the total number of events being recorded.

A related object is to provide a cost regulating and recording apparatus having means which discourage parties from tampering with it in an attempt to cheat its cost recording operation.

DESCRIPTION OF PREFERRED EMBODIMENT

Figure 1:
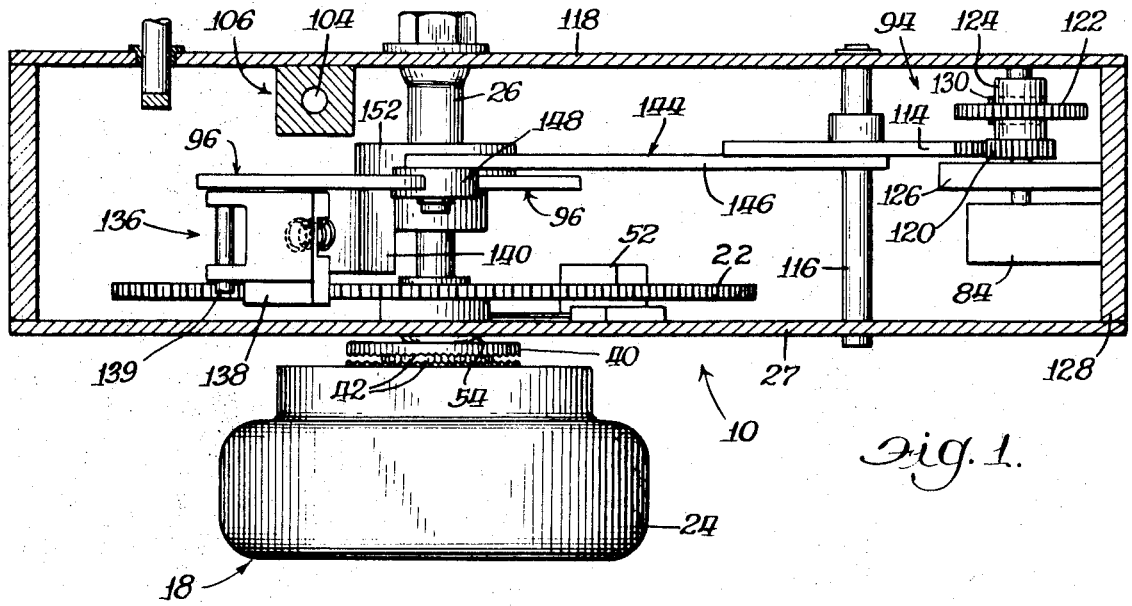
FIG. 1 is a sectional view of the programming, computing and recording apparatus of this invention taken substantially along line 1–1 of FIG. 2.
Figure 2:
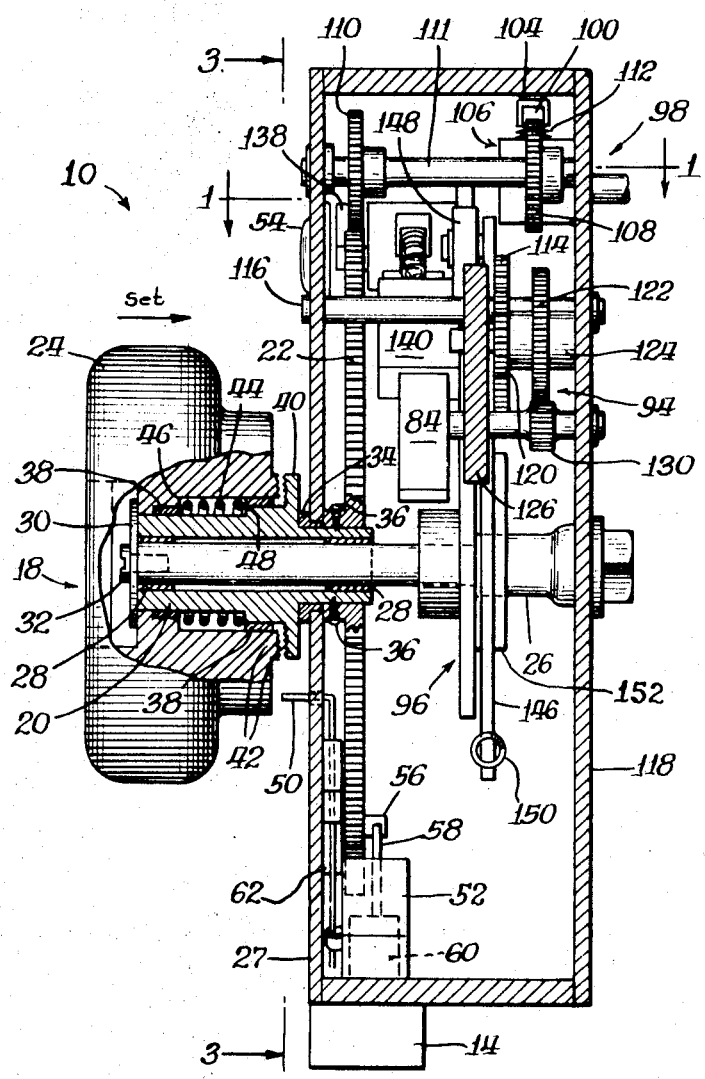
FIG. 2 is a sectional view taken along line 2–2 of FIG. 3 having sections broken away.
Figure 3:
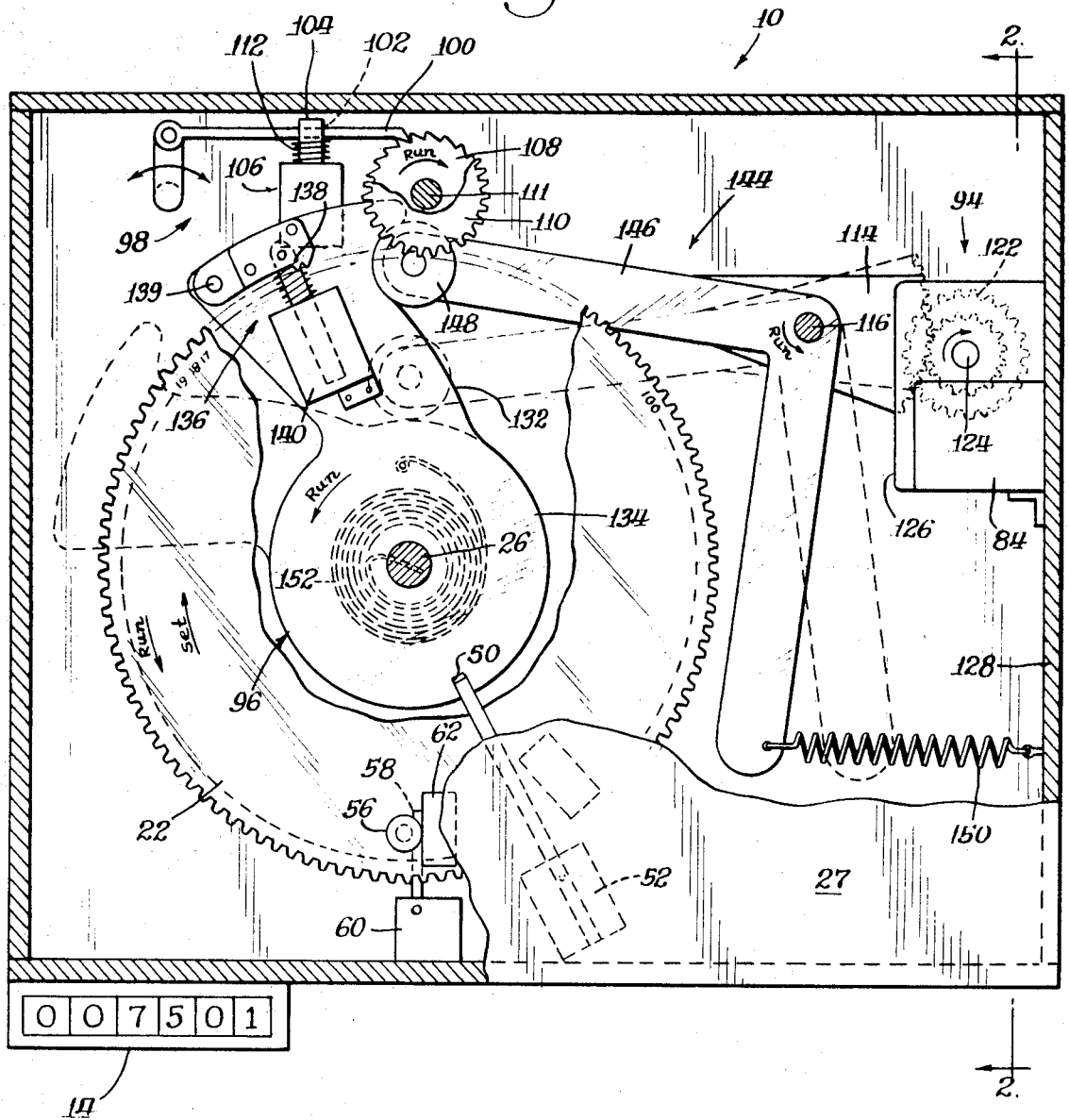
FIG. 3 is a sectional view taken along line 3–3 of FIG. 2 having sections broken away.
Figure 4:
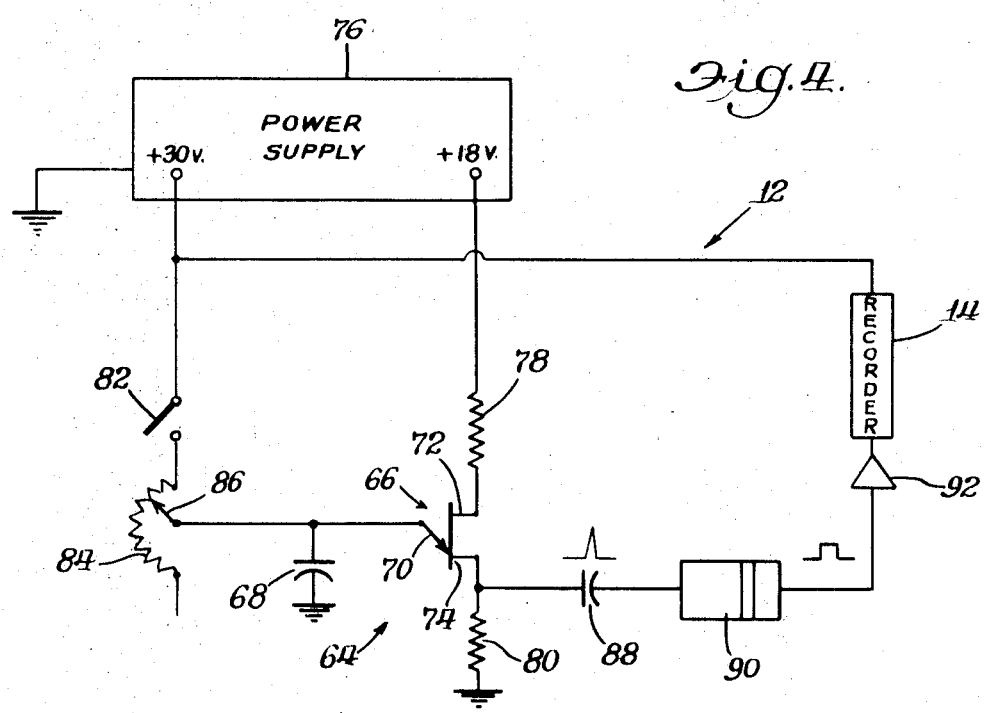
FIG. 4 is the circuit diagram of the computing instrument of this invention.
Figure 5:
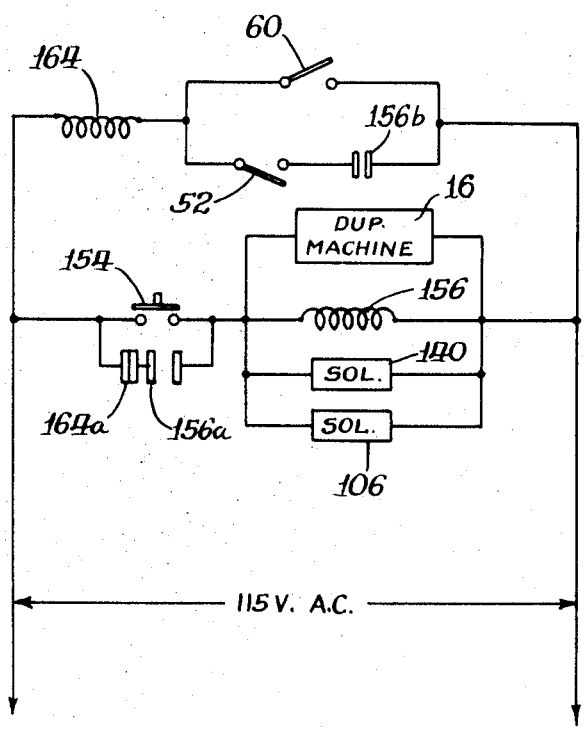
FIG. 5 is a circuit diagram illustrating the control over the operation of an associate duplicating machine exercised by the programming, computing and recording apparatus of this invention.

The chief components of this invention are a programmer 10 (FIGS. 1—3), a computing instrument 12 which is schematically illustrated in FIG. 4, and a pulse responsive recorder or counter 14 (FIGS. 3 and 4). The customer initially adjusts the programmer 10 to a setting corresponding to the number of copies to be made by the associated duplicating machine 16, (FIG. 5). He then starts the machine 16. As copies are produced, the computing instrument 12 generates different numbers of pulses per copy, and the recorder 14 counts the number of pulses generated and gives a cumulative numerical indication of the pulses received.

In accordance with one feature of this invention, the programmer 10 is equipped with a manually operable selector subassembly 18 which, upon being actuated, shuts off the duplicating machine 16, thereby canceling a programmed copy order before all the copies are made. As best seen in FIG. 2, this subassembly 18 includes a sleeve 20, a selector gear 22, and a handle 24, supported on a stationary support rod 26 extending through an enlarged opening in the front plate 27 of the programmer 10. A pair of bearings 28 seat the sleeve 20 on the rod 26 so that it can be rotated in either a clockwise or counterclockwise direction; and a stop washer 30 fastened by a screw 32 to the front end of the rod 26 and a bearing 34 intermediate the sleeve 20 and front plate 27 prevent the sleeve 20 from moving laterally along the length of the rod. Set screws 36 lock the selector gear 22 to the neck of the sleeve 20. This gear 22, having a number opposite each tooth, rotates whenever the sleeve 20 is turned, and vice versa. A second pair of bearings 38 seat the handle 24 on the sleeve 20.

The customer can move the handle 24 laterally towards and away from the front plate 27, and/or rotate it in a clockwise or counterclockwise direction with respect to the sleeve 20. The stop washer 30 and a flange portion 40 of the sleeve 20 limit the lateral movement of the handle 24 relative the plate 27. The flange portion 40 and a back segment of the handle 24 have serrated surfaces 42. When the customer depresses the handle 24, i.e., moves it towards the plate 27, these surfaces 42 engage in a clutch fashion and a coiled spring 44 loosely fitted over the sleeve 20 is compressed between the shoulders 46 and 48 of the handle 24 and the sleeve 20 respectively. When the customer releases the handle 24, the spring 44 urges it away from the front plate 27 and the serrated surfaces 42 disengage. The depressed handle also engages a feeler 50 of an abort switch 52 which passes through a second opening in the front plate 27. Even a slight depression of the handle 24 results in the closure of the abort switch, but unless the duplicating machine 16 is making copies, no useful function results. With the machine 16 operating, however, the closure of the switch 52 immediately shuts the machine off. Therefore, the operation of the abort switch 52 in response to the depression of the handle 24 provides a simple, yet reliable means for discouraging tampering with the programmer 10.

The selector gear 22 is shown in FIG. 3 in a home position. In this position, the number 0 appears in a viewer 54 carried in the front plate 27 and a pin 56 projecting from the front and back of the gear 22 contacts simultaneously the feeler 58 of a control switch 60 and a stop plate 62. So long as the pin 56 engages the feeler 58, the duplicating machine 16 is nonoperational, but with the gear 22 in a set position the pin 56 and feeler 58 disengage and the machine can be started.

The customer sets the programmer 10 by depressing the handle 24 to engage the serrated surfaces 42, and then turns the handle to locate opposite the viewer 54 the number on the gear 22 corresponding to the number of copies desired. This moves the gear 22 from home position to a set position.

In accordance with the major feature of this invention, the computing instrument 12 (FIG. 4) generates as copies are made differing numbers of pulses per copy. To provide a simplified and compact means for accomplishing this, the computing instrument 12 employs a pulse generator 64 comprising a control conduction device, such as a unijunction transistor 66, and a capacitor 68 coupled to the emitter 70 of the transistor. The upper base 72 and lower base 74 of the transistor 66 are, respectively, connected to the +18 volt terminal of a constant voltage power supply 76 and ground through limiting resistors 78 and 80. The capacitor 68 is also coupled to the +30 volt terminal of the power supply 76 through a copy switch 82 and variable resistor control element 84. The control element 84 is contained in the programmer 10.

The production of a copy closes the copy switch 82 for an exact time interval, and the capacitor 68 is charged. This switch 82 can be closed by the lead edge of the copy sheet or otherwise operated every time a copy is made. The setting of the operator 86 of the control element 84 governs the rate at which the capacitor 68 is charged. When the charge on the capacitor reaches a predetermined level, the transistor 66 changes state, going from a nonconductive to conductive state and the capacitor 68 discharges through the transistor to ground. Simultaneously, a positive going pulse appears across a coupling condenser 88 which connects a "one shot" or monostable multivibrator 90 to the lower base 74 of the transistor 66. The multivibrator 90 converts the pulse to a square wave signal which is transmitted via an amplifier 92 to the recorder 14. This increases the count of the recorder 14 by one unit. By moving the operator 86 to different settings as copies are made, the rate of charging the capacitor 68 is varied, and consequently different numbers of pulses per copy are generated. A ratchet drive 98 (FIGS. 1—3) actuated as copies are made moves the operator 86 to different settings; the operator is coupled to the drive through a train of gears 94 and cam 96.

The ratchet drive 98 includes a pawl 100 which passes through an opening 102 in the plunger 104 of a solenoid 106, and a ratchet wheel 108 and a drive gear 110 mounted on a common shaft 111. When the duplicating machine 16 is nonoperational, the solenoid 106 is deenergized and the solenoid spring 112 urges the pawl 100 in a direction away from the wheel 108, enabling the wheel to turn freely in either a clockwise or counterclockwise direction. With the machine 16 running, the solenoid 106 is energized so that the plunger 104 pulls the pawl 100 into engagement with the wheel 108. Each time a copy is made the pawl 100 moves through a reciprocal stroke to turn the wheel 108 in a clockwise direction. At the same time the driving gear 110 moves an increment of one tooth in a clockwise direction, causing the selector gear 22 to turn in a counterclockwise direction. Thus, as the pawl 100 moves through its reciprocal stroke, it displaces the selector gear 22 in a direction towards home position by an increment of one tooth.

The gear train 94 includes a segmented gear 114 mounted on the shaft 116. This segmented gear meshes with the smaller one of a pair of gears 120 and 122 mounted on axle 124 that is carried between the rear plate 118 and a support block 126 affixed to the side plate 128. The larger gear 122 meshes with a geared shaft 130 which is also carried between the block 126 and rear plate 118. The operator 86, being attached to this shaft 130, is adjusted as the geared shaft rotates. The degree through which the segmented gear 114 moves, and consequently the degree of movement imparted to the operator 86, is governed by the position of the cam 96. Hence, the charging rate depends on the control position of the cam 96.

The cam 96 has a graduated portion 132 and a lobe 134, and is rotatably mounted on the support rod 26, being moved from a home position to different control positions as copies are made. As seen in FIG. 3, the cam 96 is at home when it is in a generally vertical position. A control position is illustrated in dotted lines. Attached to the body of the cam 96 is a latching mechanism 136 including a claw 138 pivotally mounted on a support 139, and a latching solenoid 140. So long as the solenoid 140 is deenergized, the claw 138 rides up and over the teeth of the gear 22 whenever the gear turns. When the customer starts the machine 16, the solenoid 140 is energized holding the claw 138 in locking engagement with the gear 22.

As copies are made, the ratchet drive 98 moves the selector gear 22 towards its home position and the cam 96 away from its home position. A follower assembly 144, including an L-shaped arm 146 secured to the shaft 116 and a follower 148 mounted on the upper end of the arm 146, monitors the position of the cam 96. This arm 144 is biased in a counterclockwise direction by a spring 150 connected intermediate the side plate 128 and the lower end of the arm 146. As copies are made, the follower 148 rides over the graduated portion 132 and lobe 134 and the biased arm 146 turns the shaft 116 to actuate the gear train 94. This moves the operator 86 to progressively higher resistance levels. In the illustrated control position of the cam 96, maximum gear displacement of the train 94 and maximum adjustment of the operator 86 in one direction are achieved, setting the control element 84 at its highest resistance level.

A reset spring 152 fitted about the rod 26 and having one of its ends connected to the cam 96 and the other affixed to the rod always returns the cam 96 and operator 86 to their home position and start setting, respectively, after a copy order has been completed. This insures that the same average cost per copy will be recorded for copy orders of the same size. As the ratchet drive 98 rotates the cam 96 in a counterclockwise direction away from its home position to a control position, torque is created in spring 152. After the machine 16 produces the programmed number of copies, the solenoid 140 is deenergized unlatching the cam 96 and selector gear 22, the reset spring 152 returns the cam 96 to its home position, and the arm 146 rotates in a clockwise direction. The movement of the arm 146 causes the gears in the train 94 to rotate in a direction opposite to that which they are normally rotated during the production of copies. This resets the operator 86 at its start setting.

A review of the operation of this invention is now presented with reference to the control circuit shown in FIG. 5. The customer first moves the selector gear 22 to a set position and then activates the duplicating machine 16 by closing a push button start switch 154. The latter operation, in addition to starting the duplicating cycle of the machine 16, energizes the solenoids 106 and 140 and a start relay 156 to close the normally open pairs of contacts 156a and 156b. The closure of contacts 156a completes a holding circuit including the normally closed pair of contacts 164a on a release relay 164. The energized latching solenoid 140 locks the cam 96 and gear 22 together, and the energized drive solenoid 106 pulls the plunger 104 down bringing the pawl 100 into driving relationship with the ratchet wheel 108. With the production of each copy, the copy switch 82 is closed and the reciprocally driven ratchet drive 98 moves the selector gear 22 towards its home position and the cam 96 to a control position. The closure of the copy switch 82 charges the capacitor 68, and the position of the cam 96 controlling the setting of the operator 86 regulates the rate of charging. When the charge on the capacitor 68 reaches a predetermined level, the transistor 66 becomes conductive and the capacitor discharges to provide a pulse which actuates the recorder 14. As more and more copies are made, fewer pulses are generated because the operator 86 is moved to progressively higher resistance levels. With the production of the number of copies ordered by the customer, the selector gear 22 is returned to its home position to close the control signal switch 60. This energizes the release relay 164 opening the contacts 164a to shut down the machine 16, and deenergizes the start relay 156 and solenoids 106 and 140. If the customer depresses the handle 24 while the machine 16 is making copies, the abort switch 52 is closed to energize the release relay 164 over the circuit including the abort switch 52 and the closed contacts 156b. The abort switch 52 is closed during the initial programming operation, but at this time the contacts 156b are open and no useful function results. If anyone depresses the handle 24 while the machine 16 is making copies, the abort switch 52 functions to shut the machine off.

Although the present invention has been described with reference to a single illustrative embodiment, numerous other modifications and embodiments can be devised by those skilled in the art which fall within the spirit and scope of the principles of this invention. For example, the cam 96 may take many shapes or even be eliminated. Moreover, the pulse output of the computing instrument 12 can be controlled to provide more pulses as events occur rather than fewer pulses or varied in accordance with any predetermined plan.

I claim:

1. Apparatus for providing a total numerical indication representative of an evaluation of a condition for a preselected number of events wherein the average evaluation per event is automatically changed and whereby the average number of pulses per event is responsive to changes in resistance in a predetermined nonlinear manner as the number of events selected is increased, said apparatus comprising:
   means for selecting the number of events to be evaluated;
   means for automatically determining the nonlinear rate of evaluation per event depending upon the number of events selected, said rate determining means including pulse generating means for generating a predetermined number of pulses in accordance with the determined rate; and
   recordation means coupled to said rate determining means and actuated by the pulses therefrom to provide determining means and actuated by the pulses therefrom to provide a cumulative indication of the number of pulses received thereby, said total number of pulses being proportional to the total evaluation of said preselected number of events.

2. Apparatus as claimed in claim 1 wherein said means for selecting the number of events to be evaluated comprises a manually operated selector movable between a home position and a plurality of settings corresponding to different numbers of events, and wherein said rate determining means includes selector means coupled to said manually operated selector and movable in accordance therewith to a plurality of settings, each said setting corresponding to a different number of pulses to be produced as said predetermined number of events occurs.

3. Apparatus as claimed in claim 2 wherein said manually operated selector is moved automatically from a set position toward said home position incrementally until the number of events to be evaluated has been completed, and wherein said selector means of said rate determining means includes a cam member having a predeterminedly contoured camming surface, and a cam follower movable therealong, the cam follower being coupled to said pulse generating means, said cam member being moved from a set position corresponding to the set position of said manually operated selector, to the home position, incrementally in accordance with the movement of said selector, and said cam follower moving along the contoured surface of said cam member and thereby controlling the number of pulses generated by said pulse generating means during the movement of said cam member from the set to the home position.

4. Apparatus as claimed in claim 3 wherein said pulse generating means includes a controlled conduction device operable between conductive and nonconductive states, capacitor means coupled to said conductive device, and variable resistance means, being electrically coupled to said capacitor means, said capacitor means upon being charged to a predetermined level, changing the state of said device from nonconductive to conductive and discharging through said device to produce a pulse, said device returning to a nonconductive state with the discharge of said capacitor means, said variable resistance means being mechanically coupled to said cam follower and being varied in accordance with the movement thereof along said cam member, said variable resistor means regulating the charging rate of said capacitor means as a function of its resistance level, thereby to control the pulses generated.

5. Apparatus as claimed in claim 1 further including manually operable means for cancelling the number of events selected before the occurrence of said events.

6. Apparatus for recording a total numerical indication representative of an evaluation of a condition for a preselected number of events comprising:
   means for selecting the number of events to be recorded, said selector means being movable between a home position and a plurality of different set positions corresponding to different numbers of events to be recorded;
   means for computing the rate at which said preset number of events are to be recorded including:
   a. pulse generating means energized as events occur for producing pulses,
   b. a control element for regulating the number of pulses produced by said pulse generating means, said control element having a movable operator adjustable between a start setting and a plurality of different control settings corresponding to different numbers of pulses to be produced as events occur,
   c. cam means having a portion graduated in a predetermined manner for determining the rate at which events are recorded, said cam means being movable between a home position and a plurality of different control positions corresponding to different recording rates,
   d. means actuated after the selector means have been moved to a given set position for latching the selector means and cam means together so that they are capable of moving together as a unit,
   e. drive means operated as events occur for moving the latched together selector means an cam means, whereby said selector means is returned to its home position and said cam means is moved from its home position, f. cam follower means which rides along said portion as the cam means is moved to and from its home position, g. means coupling the follower means to the operator so that as events occur the cam means adjusts the setting of the operator in accordance with the control position said cam is at; and recording means coupled to the pulse generating means and actuated upon the generation of the pulse for providing a cumulative numerical indication of the number of pulses received, thereby recording in relative numerical values at the rate established by the computing means the evaluation of said condition for the number of events occurring.

7. The apparatus as defined in claim 6 wherein said selector means includes means actuated when said selector means is returned to its home position which deactuates said latching means, and means operated when said latching means is deactuated for returning said cam means to its home position, whereby said operator is set at its start setting with the return of the cam means to its home position.

8. The apparatus as defined in claim 6 including means actuated when said selector means returns to its home for providing a control signal.

9. The apparatus as defined in claim 6 wherein said selector means further includes manually operable means for cancelling the preset number of events before said events occur.

10. The apparatus as defined in claim 9 wherein said canceling means includes a depressable handle which is connected to said selector means, said handle upon being depressed and turned moves said selector means to a set position, with said canceling means being activated after said events begin to occur by depressing said handle.